UNITED STATES PATENT OFFICE.

GENNARO PUCCIARELLI, OF JERSEY CITY, NEW JERSEY.

LOTION.

No. 928,539.  Specification of Letters Patent.  Patented July 20, 1909.

Application filed April 16, 1908.  Serial No. 427,336.  (Specimens.)

*To all whom it may concern:*

Be it known that I, GENNARO PUCCIARELLI, a citizen of the United States, residing in Jersey City, in the county of Hudson, in the State of New Jersey, have invented a new and Improved Lotion to be Applied Externally for the Removal of Pimples and other Faults of the Skin.

All the ingredients of the lotion are soluble or disintegrable, often termed soluble in water. I have discovered that the resultant compound makes a peculiarly effective medicine for external use when combined under proper conditions.

I conduct the manufacture by stages, making two solutions having certain elements separately dissolved in each, and afterward combining what I shall term the solutions. The following is a description of what I consider the best means of making the separate solutions. The first solution "A" is produced by dissolving or disintegrating in three quarts of distilled water,—zinc sulfate ($ZnSO_4 7H_2O$) in its ordinary commercial form of crystals, thirteen and one half ounces and potassium hyposulfite ($K_2S_2O_4$) five and one half ounces. To make the other solution "B" I add to three quarts of distilled water,—potassium sulfid ($K_2S$) four and one half ounces.

After both solutions have been produced by completely dissolving the materials, or in more exact language disintegrating all the solid matter, the combining of the two liquids is commenced and continued by adding to solution A small quantities of solution B at short intervals with much shaking or stirring. A good apparatus for this purpose may be a churn. It should be set apart to be used solely for this work. During the mixing of the two solutions the zinc sulfate changes very rapidly into zinc sulfid ($ZnS$) and is the principal ingredient of the finished product. The change of the potassium sulfid into potassium sulfate ($K_2SO_4$) is slightly slower. Potassium hyposulfite is added as a bleach but it soon loses its identity becoming potassium sulfate. When solution B has been all added by small installments to solution A and intimately mixed therewith by continuous and active agitation I add a small quantity, say ten drops, of oil of rose geranium, and after this I add water enough to make the whole mixture measure two gallons.

The lotion is now ready for use, storage, or shipment. It should be labeled "For external use" and must be well shaken before each use. The lotion is applied gently to the skin, preferably without rubbing. It should be allowed to dry thereon. The bottle should not be allowed to remain long uncorked. I find exposure to the air at any temperature induces a darkening of the color. I believe this to be due to a change of the potassium hyposulfite into sulfate. My experiments indicate that it will remain practically unchanged for long periods. I believe it will endure any climate if kept corked.

I claim as my invention:

1. The herein-described process of making a toilet lotion consisting in gradually combining an aqueous solution of potassium sulfid with an aqueous solution of zinc sulfate and of potassium hyposulfite in about the proportions stated.

2. The toilet lotion herein described composed of an aqueous mixture of zinc sulfid and potassium sulfate, and having the offensive odor therefrom modified by a suitable perfume.

Signed at Jersey City, N. J., this 24th day of March 1908.

GENNARO PUCCIARELLI. [L. S.]

Witnesses:
HORACE MACBRIDE,
WALTER L. ROBERTSON.